United States Patent
Sarovar et al.

(10) Patent No.: US 10,341,015 B1
(45) Date of Patent: Jul. 2, 2019

(54) SECURE FIBER OPTIC SEALS ENABLED BY QUANTUM OPTICAL COMMUNICATION CONCEPTS

(71) Applicant: Sandia Corporation, Albuquerque, NM (US)

(72) Inventors: Mohan Sarovar, Albany, CA (US);
David Farley, Livermore, CA (US);
Daniel B. S. Soh, Pleasanton, CA (US);
Ryan Camacho, Albuquerque, NM (US); Constantin Brif, Tracy, CA (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 8 days.

(21) Appl. No.: 15/279,706

(22) Filed: Sep. 29, 2016

Related U.S. Application Data

(60) Provisional application No. 62/243,522, filed on Oct. 19, 2015.

(51) Int. Cl.
| | | |
|---|---|---|
| *H04B 10/85* | (2013.01) | |
| *H04B 10/079* | (2013.01) | |
| *H04B 10/50* | (2013.01) | |
| *H04B 10/70* | (2013.01) | |

(52) U.S. Cl.
CPC ......... *H04B 10/0795* (2013.01); *H04B 10/50* (2013.01); *H04B 10/70* (2013.01); *H04B 10/85* (2013.01)

(58) Field of Classification Search
None
See application file for complete search history.

(56) References Cited

U.S. PATENT DOCUMENTS

| | | | | |
|---|---|---|---|---|
| 4,106,849 A | * | 8/1978 | Stieff | G02B 6/40 385/115 |
| 4,262,284 A | * | 4/1981 | Stieff | G09F 3/0376 340/507 |
| 4,447,123 A | * | 5/1984 | Page | G02B 6/2804 250/227.15 |

(Continued)

OTHER PUBLICATIONS

Huang et al., Continuous-variable quantum key distribution with 1 Mbps secure key rate, Jun. 2015, Optics Express, pp. 17511-17519.*

(Continued)

*Primary Examiner* — Kenneth N Vanderpuye
*Assistant Examiner* — Jai M Lee
(74) *Attorney, Agent, or Firm* — Medley, Behrens & Lewis, LLC

(57) ABSTRACT

Described herein are various technologies pertaining to detecting tampering of a seal based upon quantum optical communication via a communications channel comprising the seal. A plurality of pulses of light encoded with random data are transmitted on the communications channel, whereupon they are received and their data values measured. The measured data values of the pulses are then compared to the known transmitted data to determine a correlation statistic between the transmitted and received data values. Tampering with the seal can be detected based upon identifying that the correlation statistic has dropped below a threshold non-tampered level of correlation between transmitted and received values.

20 Claims, 5 Drawing Sheets

(56) References Cited

U.S. PATENT DOCUMENTS

| | | | | |
|---|---|---|---|---|
| 4,523,186 | A * | 6/1985 | Fiarman | G08B 13/126 340/555 |
| 5,452,394 | A * | 9/1995 | Huang | G02B 6/105 385/11 |
| 5,850,441 | A | 12/1998 | Townsend et al. | |
| 6,002,501 | A * | 12/1999 | Smith | G01M 3/28 356/44 |
| 6,069,563 | A * | 5/2000 | Kadner | G08B 13/06 340/539.1 |
| 6,304,713 | B1 * | 10/2001 | Isogai | G06K 9/00 250/227.15 |
| 7,403,623 | B2 | 7/2008 | Cerf et al. | |
| 7,929,700 | B2 | 4/2011 | Lodewyck et al. | |
| 7,936,883 | B2 | 5/2011 | Imai et al. | |
| 8,077,047 | B2 * | 12/2011 | Humble | G08B 13/186 340/552 |
| 8,165,298 | B2 | 4/2012 | Kawamoto et al. | |
| 8,477,939 | B2 | 7/2013 | Youn et al. | |
| 8,654,980 | B2 | 2/2014 | Harrison et al. | |
| 8,683,192 | B2 | 3/2014 | Ayling et al. | |
| 8,982,360 | B2 * | 3/2015 | Zhao | G08B 13/08 356/614 |
| 9,148,225 | B2 | 9/2015 | Lowans et al. | |
| 9,329,098 | B2 * | 5/2016 | Sanchez | G01M 11/30 |
| 2004/0247316 | A1 * | 12/2004 | Soto | H04B 10/071 398/47 |
| 2006/0256966 | A1 * | 11/2006 | Kuang | H04B 10/70 380/256 |
| 2006/0261959 | A1 * | 11/2006 | Worthy | G08B 13/1445 340/572.8 |
| 2007/0069893 | A1 * | 3/2007 | Anderson | G08B 13/186 340/541 |
| 2007/0230688 | A1 * | 10/2007 | Tajima | H04L 9/0858 380/30 |
| 2007/0257201 | A1 * | 11/2007 | Kent | H04B 10/70 250/442.11 |
| 2010/0299256 | A1 * | 11/2010 | Gallagher | G06Q 20/0855 705/42 |
| 2011/0064222 | A1 * | 3/2011 | Wiseman | H04L 9/0827 380/255 |
| 2011/0206369 | A1 * | 8/2011 | Goldner | H04B 10/85 398/25 |
| 2012/0148233 | A1 * | 6/2012 | Eiselt | H04B 10/85 398/28 |
| 2015/0310715 | A1 * | 10/2015 | Nekoogar | G08B 13/06 340/572.1 |
| 2016/0377423 | A1 * | 12/2016 | Eilers | H04L 9/00 356/601 |

OTHER PUBLICATIONS

Rajput, R. K., Basic Electrical and Electronics Engineering, 2006, Firewall Media, pp. 640-641.*
Pal, Bishnu P., Fundamentals of Fibre Optics: In Telecommunication and Sensor Systems, 1992, New Age International Ltd., pp. 126-138.*
Zhang, Lijian, Towards Single Photon Quantum Key Distribution with Continuous Variables, 2009, University of Oxford, pp. 13-19.*
Wikipedia, Covariance Matrix, Nov. 2014, https://en.wikipedia.org/wiki/Covariance_matrix.*
Wikipedia, Pearson product-moment correlation coefficient, Mar. 2015 http://en.wikipedia.com/wiki/Pearson_correlation_coefficient.*
Medhi, Von Neumann Architecture, 2012, http://www2.cs.siu.edu/~cs401/Textbook/ch2.pdf.*
Calkins, Keith G., Applied Statistics—Lesson 5 : Correlation Coefficients, 2005, http://www.andrews.edu/~calkins/math/edrm611/edrm05.htm (Year: 2005).*
Williams et al., A tamper-indicating quantum seal, 2015 (Year: 2015).*
Humble et al., Tamper-indicating Quantum Seals, Jun. 2015 (Year: 2015).*
Humble, et al., "Sensing Intruders Using Entanglement: A Photonic Quantum Fence", In Proceedings of SPIE, vol. 7342, 2009, pp. 73420H-1-73420H-10.
Williams, et al., "A Tamper-Indicating Quantum Seal", In Physical Review Applied, vol. 5, No. 1, 2016, pp. 1-10.
Wills, Stewart, "A Quantum Anti-Tamper Seal", In Optics and Photonics News, Jan. 7, 2016, Retrieved at: <<http://www.osa-opn.org/home/newsroom/2016/january/a_quantum_anti-tamper_seal/>>, 4 pages.

* cited by examiner ns channel.
SECURE FIBER OPTIC SEALS ENABLED BY QUANTUM OPTICAL COMMUNICATION CONCEPTS

RELATED APPLICATION

This application claims priority to U.S. Provisional Patent Application No. 62/243,522, filed Oct. 19, 2015, and entitled "SECURE FIBER OPTIC SEALS ENABLED BY QUANTUM KEY DISTRIBUTION", the entirety of which is incorporated herein by reference.

STATEMENT OF GOVERNMENTAL INTEREST

This invention was developed under Contract DE-AC04-94AL85000 between Sandia Corporation and the U.S. Department of Energy. The U.S. Government has certain rights in this invention.

BACKGROUND

Seals and locks are used to secure a variety of objects, including containers and entrances to secure facilities. In addition to ordinary physical seals such as padlocks, seals have been developed that use electrical or fiber optic loops placed around or through an object to be secured. These electrical and fiber optic seals operate by detecting interruptions in electrical or optical signals propagating in the loop securing the object. When an interruption is detected, it is treated as an indication of a security breach. These seals are vulnerable, however, to sophisticated tampering techniques that can replicate the electrical or optical signal propagated through the loop to prevent a detection of interruption from occurring even when the seal is broken.

SUMMARY

The following is a brief summary of subject matter that is described in greater detail herein. This summary is not intended to be limiting as to the scope of the claims.

Described herein are technologies for securely sealing objects and containers by using quantum optical communication concepts to detect communications channel degradation effects caused by tampering. A fiber optic loop or other optical communications channel serves as a seal that secures the object or container to be sealed. The communications channel connects an optical transmitter and an optical receiver that engage in quantum optical communication. The transmitter sends pulses of light encoded with random data. The receiver receives the pulses and decodes the data, whereupon the encoded data and the decoded data are compared to determine a measure of correlation between what was transmitted by the transmitter and what was received by the receiver. As a result of quantum mechanical relationships between the quantum state preparation by the transmitter and measurement of the prepared state by the receiver, tampering with the communications channel, including attempting to replicate the transmitted light or spoof the data transmitted by the transmitter, causes discrepancy between the ideal quantum-uncertainty limited correlation measurement and the actual measurement correlation through the tempered channel. Tampering with the communications channel (i.e., the seal), therefore, can be detected based upon the correlation measure being below a threshold value of correlation identified in a calibration procedure conducted prior to tampering on the communications channel.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
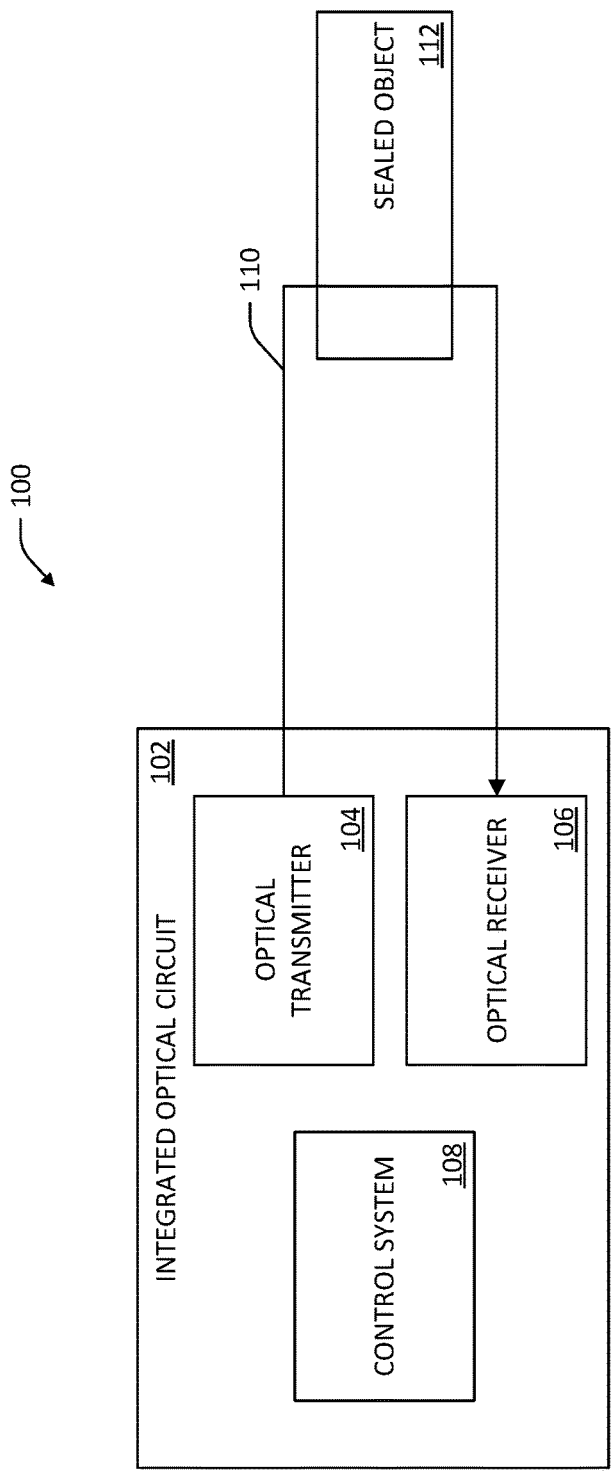
FIG. 1 is a functional block diagram of an exemplary system that facilitates securely sealing objects based upon correlation statistics of quantum optical communication between a transmitter and receiver over a communications channel.

Various technologies pertaining to secure optical seals are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Additionally, as used herein, the term "exemplary"

is intended to mean serving as an illustration or example of something, and is not intended to indicate a preference.

Certain embodiments of continuous-variable and discrete-variable optical transmitters and receivers that can be used in connection with systems and methods described herein are disclosed in greater detail in U.S. patent application Ser. No. 15/078,883, filed on Mar. 23, 2016, and entitled "TRANSCEIVERS AND RECEIVERS FOR QUANTUM KEY DISTRIBUTION AND METHODS PERTAINING THERETO", the entirety of which is incorporated herein by reference.

With reference to FIG. 1, an exemplary sealing system 100 that facilitates secure sealing of containers via quantum optical communication is illustrated. The system 100 includes an integrated optical circuit 102 comprising an optical transmitter 104, an optical receiver 106 that is in optical communication with the optical transmitter 104, and a control system 108 that controls operation of the optical transmitter 104 and optical receiver 106. The integrated optical circuit 102 comprises a same chip substrate on which the transmitter 104, the receiver 106, and the control system 108 are deposited, implemented, or otherwise installed. In other exemplary embodiments, the transmitter 104, the receiver 106, and the control system 108 may be implemented as separate integrated circuits. The optical transmitter 104 and the optical receiver 106 are in optical communication by way of a communications channel 110 that serves as a seal for a container or other object 112. In an exemplary embodiment, the communications channel 110 can be a helical core fiber optic cable that is placed through or around at least a portion of the sealed object 112. In the example, the integrated optical circuit 102 can detect various forms of tampering with the fiber optic cable, and thus attempts to circumvent the seal, by analyzing correlation statistics between random data pulses transmitted by the transmitter 104 and signals received by the receiver 106. The integrated optical circuit 102 takes advantage of quantum mechanical principles by identifying discrepancies between quantum states of light transmitted by the transmitter 104 and the quantum states of the light as received at the receiver 106. An observed increase in these discrepancies over the expected quantum uncertainty limited value (or, from another perspective, a correspondent decrease in a measure of correlation between the transmitted states and the received states) can be interpreted as indicative of tampering on the communications channel.

Details of operation of the system 100 are now described. The control system 108 controls operation of the transmitter 104 and receiver 106 and performs analysis on data received by the receiver 106 in order to determine whether the communications channel 110 that is used to seal the sealed object 112 has been tampered with. The control system 108 generates random data (e.g., using a true random number generator) and causes the optical transmitter 104 to transmit pulses of light encoded with the data to the optical receiver 106. The transmitter 104 transmits randomized data to the optical receiver 106 based upon control signals sent to the transmitter 104 by the control system 108. The transmitter 104 encodes the data on quantum states of the light. In one embodiment, described in greater detail below with respect to FIG. 2, the transmitter 104 encodes data on one or more quadratures of the light. In another embodiment, described in greater detail below with respect to FIG. 3, the transmitter 104 encodes data on a polarization state of a photon of the light.

The control system 108 maintains a list of the transmitted data for later processing and analysis. The receiver 106 then receives the signals by way of the communications channel 110 and outputs signal measurements or calculated values for the data encoded on the signals to the control system 108, whereupon the control system 108 stores a value for the data received at the receiver 106 for each pulse. The control system 108, therefore, maintains a first record of data values sent by the transmitter 104 and a second record of data values received by the receiver 106. As a result of various losses and noise on the communications channel 110, optical signals received by the optical receiver 106 are not generally identical to those initially transmitted by the transmitter 104. The control system 108 compares a value transmitted by the transmitter 104 for a first pulse and a value received by the receiver 106 for the first pulse to determine if the transmitted value and the received value are the same. This process is repeated for a large number of pulses sufficient to overcome small number statistical variations (e.g., 1,000-10,000 or more pulses), whereupon the control system 108 can compute a correlation statistic that describes a statistical dependency between data values encoded on the pulses by the transmitter 104 and data values received and read by the receiver 106. When the communications channel 110 is tampered with, for example during attempts to subvert the seal of the object 112, a value of the correlation statistic decreases, indicating a lesser degree of correlation between the values transmitted by the transmitter 104 and values received by the receiver 106. Responsive to identifying a decrease in the value of the correlation statistic, the control system 108 can output an indication of tampering on the communications channel 110.

Since a certain level of loss and noise is always present on the channel 110, a baseline threshold correlation value can be computed during a calibration procedure prior to operational deployment of the circuit 102 (i.e., prior to exposing the seal of the communications channel to the possibility of tampering). During the calibration, the control system 108 can cause the transmitter 104 to communicate with the receiver as described above. The value of the correlation statistic computed during the calibration process can be stored by the control system 108 as a baseline threshold correlation value that represents an expected correlation between pulses transmitted by the transmitter 104 and pulses received by the receiver 106. For example, the control system 108 may compare expected data to be received by the receiver 106 (i.e., the data encoded on the pulses by the transmitter) and data actually received by the receiver 106 in each round, and may identify that the receiver 106 actually received the expected value 90% of the time. In the example, therefore, a threshold correlation value of 90% may be used by the control system 108 when determining whether tampering exists on the channel 110 in a subsequent operational deployment of the system 100. Thus, in the example, the control system 108 can determine that the communications channel 110 has been tampered with when the computed value of the correlation statistic between transmitted and received data drops below 90% correlation. In another example, the control system 108 can determine that the communications channel 110 has been tampered with when the computed value of the correlation statistic decreases by a specified amount (e.g., 10%, 15%, 25%, etc.) from the threshold correlation value).

Furthermore, a user of the system 100 can select parameters pertaining to when to output an indication of tampering on the channel 110 by providing input to the control system 108. For example, the user may provide an input signal to the control system 108 that causes the control system 108 to output an indication of tampering on the channel 110 whenever the correlation statistic decreases by 5% or more from the threshold correlation value. In another example, the input signal can cause the control system 108 to output an indication of tampering on the channel 110 when the correlation statistic decreases by 30% or more from the threshold correlation value. Thus, the user can, based upon performance and operational requirements of the seal in a deployed environment, increase or decrease a sensitivity of the system 100 to tampering by selecting different alert conditions for the control system 108.

Different forms of tampering may exhibit greater or lesser amounts of decrease in the computed correlation statistic. For example, severing the communications channel 110 to break the seal of the object 112 can reduce the correlation statistic to zero or nearly zero, while other forms of tampering such as heating or subjecting the communications channel 110 to less severe forms of physical displacement may reduce the correlation statistic by smaller amounts. A user of the system 100 can therefore, by providing input to the control system 108, cause the control system 108 to output an indication of tampering only when the computed correlation statistic indicates that a particular kind of tampering (e.g., severance of the channel 110) has occurred.

The control system 108 can compute the correlation statistic according to several methods. In a first embodiment, the control system 108 can cause the transmitter 104 and the receiver 106 to engage in many rounds of communication (e.g., transmission and receipt of 25-100 pulses of light), and can compute a correlation statistic based upon the transmitted and received data in those rounds. Repeating this process, the control system 108 can compute a new correlation statistic based upon a new block of rounds of communication. In another exemplary embodiment, the control system 108 can keep a running tally of the transmitted and received data, and can compute the correlation statistic based upon a sliding window of values. Thus, for example, the control system 108 can cause the transmitter 104 and receiver 106 to engage in an initial 50 rounds of communication (i.e., transmitting and receiving 50 encoded pulses of light), and compute an initial correlation statistic. Subsequently, the control system 108 can cause an additional round of communication to occur. The control system 108 can then use the transmitted and received data in the additional round to update the initial correlation statistic. In an example, the control system 108 can compute the updated correlation statistic based upon the additional round of communication and the last 49 rounds of the initial 50 rounds. In another example, the control system 108 can update the correlation statistic based upon the additional round of communication and all 50 of the initial rounds of communication.

In addition to the correlation test for tampering, the sealing system can also employ a timing test. The transmitter 104 can be configured to time-stamp every outgoing pulse, and the receiver 106 can be configured to time-stamp every measured pulse. The transit time (defined as the difference between the two time-stamps) is compared against an expected transit time for the length of the channel 110. A large deviation of the measured transit time from the expected transit time signals a tamper event. The degree of tolerable timing deviation can be customized by the user. This timing test enables the detection of tampering modes that function by lengthening or shortening of the optical fiber seal, while preserving noise and loss characteristics.

Figure 2:
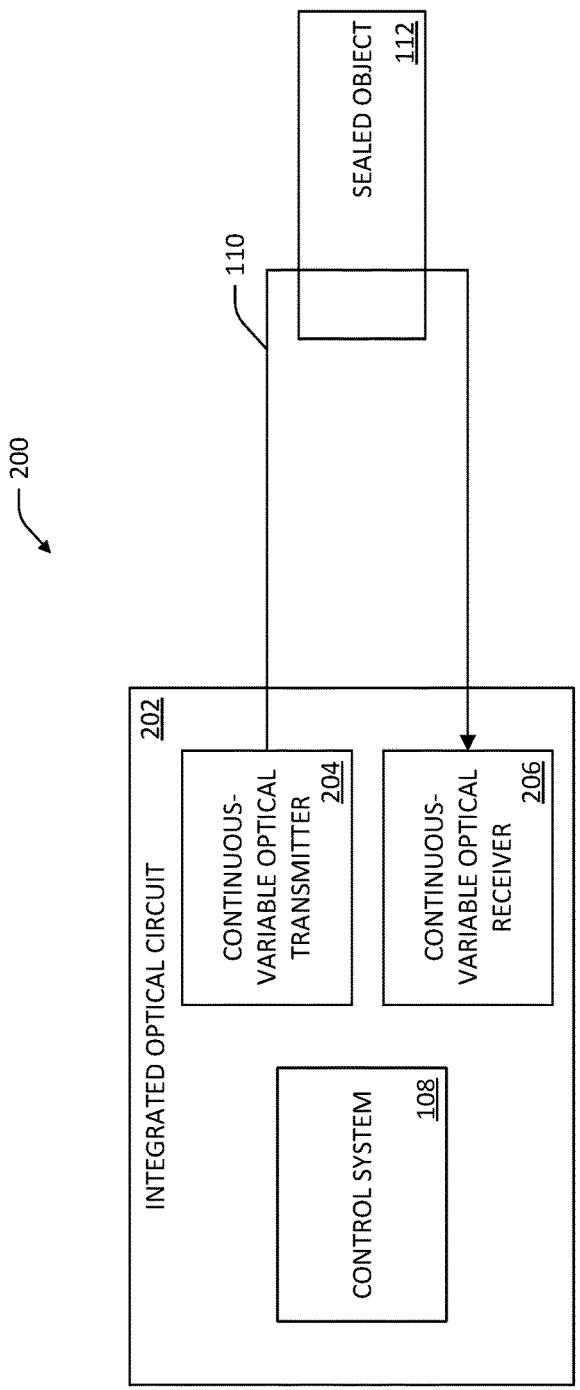
FIG. 2 is a functional block diagram of an exemplary sealing system based upon continuous-variable quantum optical communication.

Referring now to FIG. 2, an exemplary sealing system 200 that facilitates secure sealing via continuous-variable quantum optical communication is illustrated. The system 200 includes an integrated optical circuit 202 comprising a continuous-variable (CV) optical transmitter 204, a CV optical receiver 206, and the control system 108, wherein the CV transmitter 204 and the CV receiver 206 are in optical communication via the communications channel 110 that seals the object 112. As set forth above with respect to FIG. 1, the CV transmitter 204 transmits optical pulses encoded with data to the CV receiver 206, and the control system 108 computes a correlation statistic between the encoded data and data values received by the CV receiver 206. The CV transmitter 204 encodes data on two non-commuting quadratures of a pulse of light. Responsive to receiving a pulse of light from the transmitter 204 via the communications channel 110, the receiver 206 randomly selects one of the two quadratures to measure (e.g., responsive to a control signal from the control system 108 indicating which of the two quadratures to measure). The control system 108 then receives a value of the measurement of the selected quadrature from the receiver 206. After several such rounds of communication have occurred, the control system 108 can compute a covariance matrix representative of correlations between the transmitted data and the received data.

The integrated circuit 202 takes advantage of a quantum mechanical relationship between the two quadratures of the light to detect tampering. Less sophisticated attempts to subvert the seal may cause noise or other losses on the communications channel 110 that degrade the reliability of communications between the transmitter 204 and the receiver 206. More sophisticated attempts at subversion may try to spoof the data transmitted by the transmitter 204 in order to break the seal while still passing along the transmitted data to the receiver 206. Such attempts can be detected by virtue of the quantum mechanical relationship between the quadratures of light. For a given pulse, the control system 108 causes the transmitter 204 to encode a different Gaussian random value on each of the quadratures. The control system 108 stores these values, which are the expected values to be received at the receiver 206. The control system 108 then causes the receiver 206 to randomly select one of the quadratures to measure, whereupon the control system 108 compares the measured quadrature value with the expected value for the selected quadrature. When a subverter attempts to spoof the transmitter 204 by reading one of the quadrature values and retransmitting light encoded with the read quadrature value to the receiver 206, the quantum mechanical relationship between the two quadratures causes data encoded on the other quadrature to be lost (i.e., as a result of the quantum uncertainty principle). Thus, the spoofer can, at best, read and retransmit data of only one quadrature at a time. The other quadrature, having been altered by measurement of the read quadrature, has a different value from what that other quadrature was originally encoded with by the transmitter 204. Since the receiver 206 selects which quadrature to measure at random, the receiver 206 will read the different value caused by the spoofer on average approximately 50% of the time. Thus, the spoofer is unable to intercept and retransmit data on the communications channel 110 without significantly degrading a correlation statistic between transmitted and received data values. In addition, any sophisticated spoofing attempt through cloning the original quantum state fails due to the quantum no-cloning principle where quantum mechanics does not allow a perfect cloning of an arbitrary quantum state.

The integrated optical circuit 202 can further be used to detect a type of tampering that has occurred, based upon characteristics of the covariance matrix computed by the control system 108. In an example, a first type of tampering on the communications channel (e.g., mechanical vibrations or physical displacement) can be detected based upon an identification of a first characteristic of the covariance matrix by the control system 108. A second type of tampering (e.g., attempted data spoofing) can be detected based upon an identification of a second characteristic of the covariance matrix by the control system 108. The circuit 202 can therefore be configured to provide specific information about how a subverter has attempted to overcome the seal.

Figure 3:
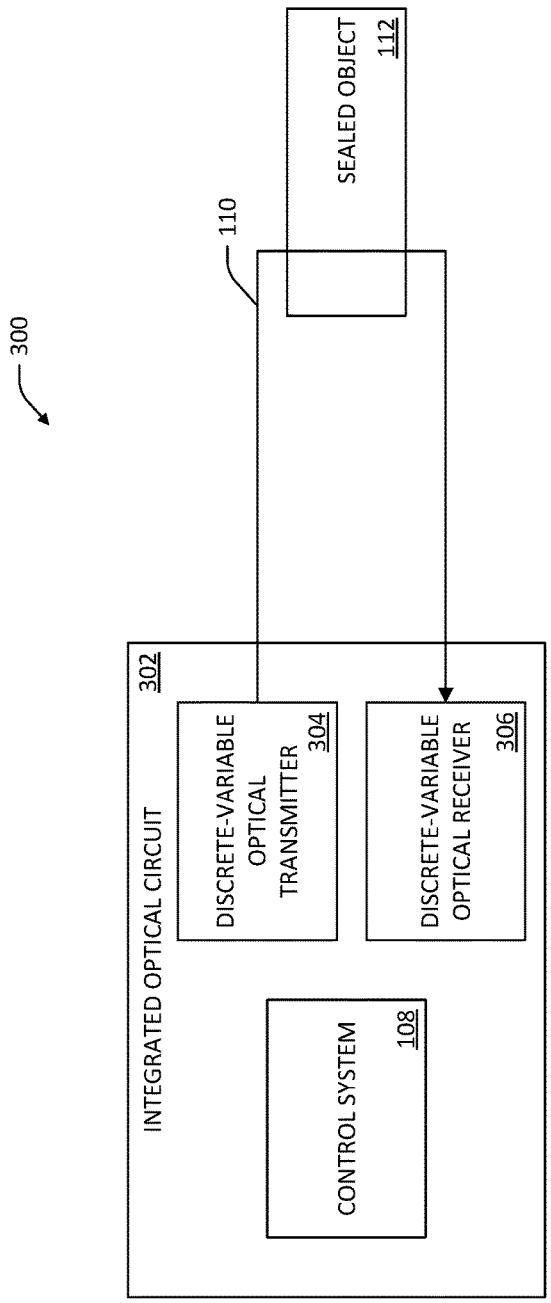
FIG. 3 is a functional block diagram of an exemplary sealing system based upon discrete-variable quantum optical communication.

Referring now to FIG. 3, an exemplary sealing system 300 that facilitates secure sealing of containers via discrete-variable quantum optical communication is illustrated. The system 300 includes an integrated optical circuit 302 that comprises a discrete-variable (DV) optical transmitter 304, a DV optical receiver 306 in communication with the transmitter 304, and the control system 108, as well as the communications channel 110 by which the transmitter 304 and the receiver 306 are in optical communication and the sealed object 112. In the DV sealing system 300, the transmitter 304 transmits pulses of few photons (e.g., truly single photons or weak coherent pulses accompanies by decoy pulses as used by decoy state quantum key distribution protocols) with data encoded on a polarization state of the photons. In DV communication, the control system 108 randomly selects a measurement basis wherein in a first measurement basis a logic "0" and logic "1" correspond to first and second polarization angles, respectively, and in a second measurement basis the logic "0" and logic "1" correspond to third and fourth respective polarization angles. Having selected the measurement basis, the control system 108 then randomly selects either a logic "0" or logic "1" to transmit in the selected basis, whereupon the control system 108 causes the transmitter 304 to transmit a photon having the necessary polarization angle for the selected measurement basis and logic value (e.g., 0° or 90° in a first measurement basis, or 45° or 135° in a second measurement basis, where these two measurement bases do not commute, and hence, the quantum uncertainty principle prevents a complete knowledge of an arbitrary quantum state through measurement using those bases).

The receiver 306 receives photons from the transmitter 304 via the communications channel 110. The control system 108, knowing the measurement basis in which any specific photon was transmitted by the transmitter 304, causes the receiver 306 to select the appropriate measurement basis, whereupon the receiver 306 identifies a polarization angle of the photon and outputs a value indicative of the polarization angle to the control system 108. The control system 108 then compares the values of the polarization angle transmitted by the transmitter 304 with the values received by the receiver 306 to determine a correlation statistic between the transmitted and received values.

Figure 4:
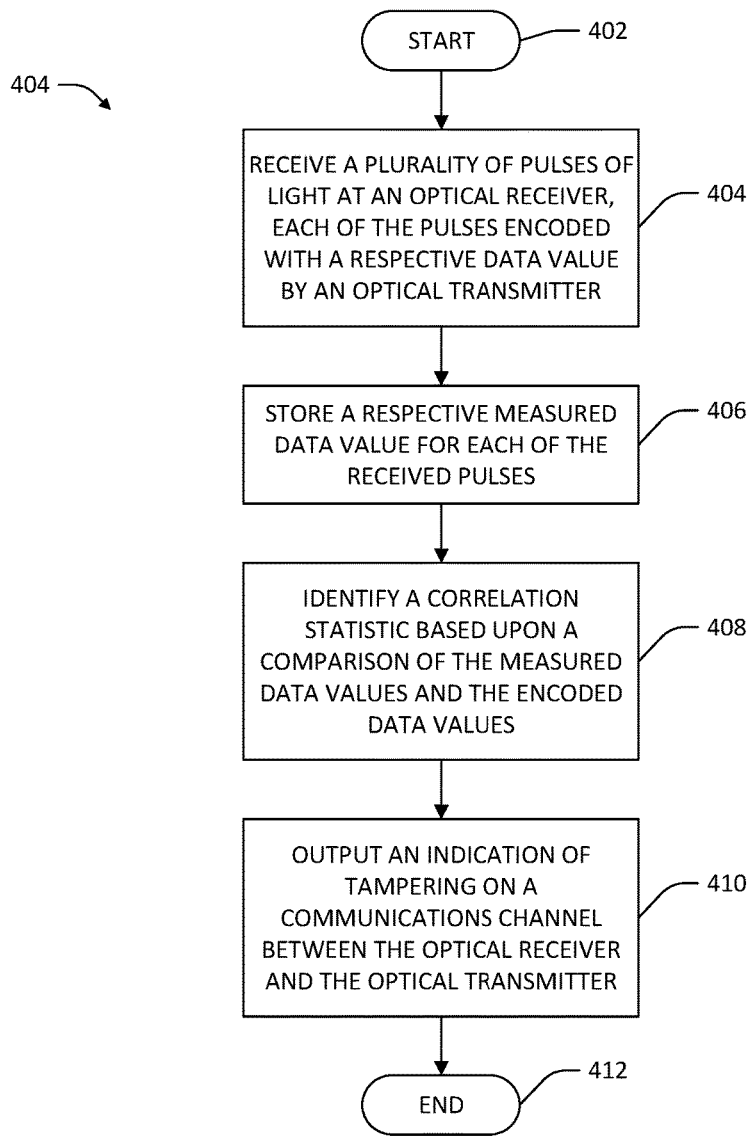
FIG. 4 is flow diagram that illustrates an exemplary methodology for operation of a sealing system based upon quantum optical communication.

FIG. 4 illustrates an exemplary methodology relating to sealing an object with an optical communications channel based upon conducting quantum optical communication on the channel. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement the methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 4, a methodology 400 that facilitates securely sealing an object using a quantum optical communication channel is illustrated. The methodology 400 begins at 402, and at 404 a plurality of pulses of light are received at an optical receiver, wherein each of the pulses is encoded with a respective data value by an optical transmitter. The pulses of light may be encoded for either continuous-variable or discrete-variable quantum optical communication. At 406 a measured data value is stored for each of the pulses received by the optical receiver. The measured data values for the plurality of pulses can be stored by a computing device or other control system that controls operation of the transmitter and the receiver. A correlation statistic is then identified at 408 based upon a comparison of the data values measured by the receiver and the data values encoded by the transmitter. The correlation statistic can be indicative of a relationship or similarity between the data transmitted by the transmitter and the data received by the receiver. An indication of tampering on a communications channel between the optical receiver and the optical transmitter can then be output at 410 based upon the identified correlation statistic, whereupon the methodology ends at 412. The indication of tampering on the communications channel can be output, for example, based upon determining that data received by the receiver is less similar to the data transmitted by the transmitter than is expected for the communications channel absent tampering.

Figure 5:
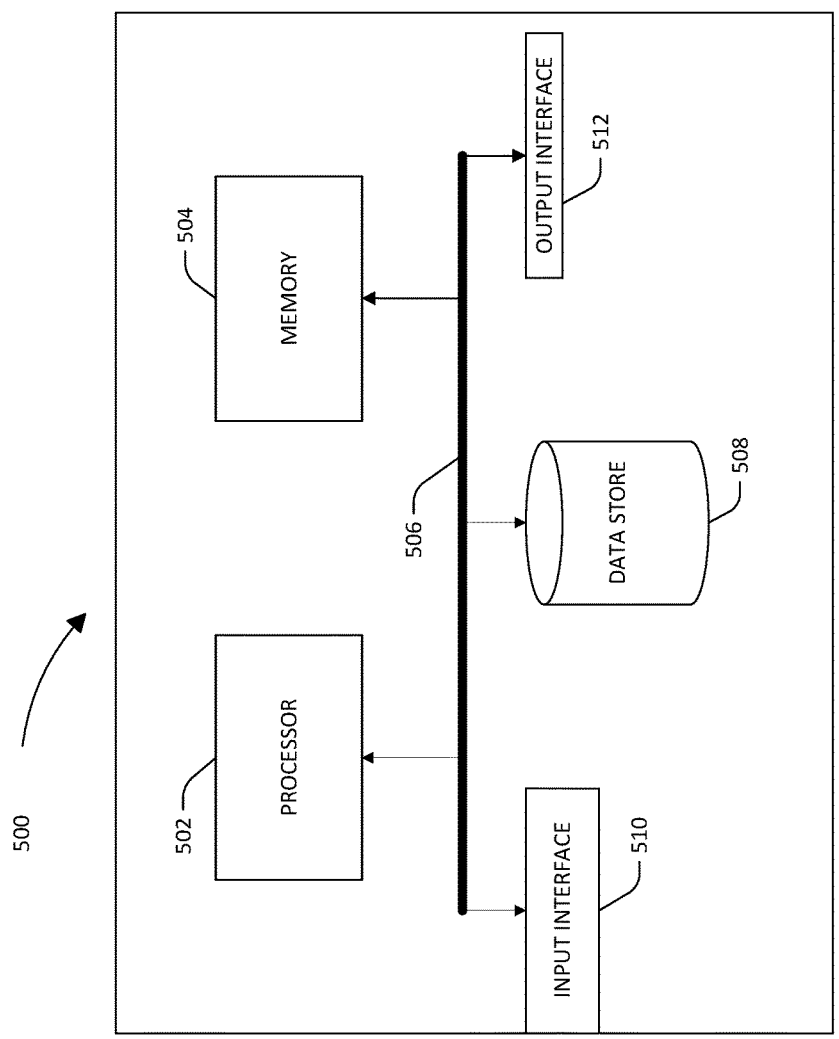
FIG. 5 is an exemplary computing system.

Referring now to FIG. 5, a high-level illustration of an exemplary computing device 500 that can be used in accordance with the systems and methodologies disclosed herein is illustrated. For instance, the computing device 500 may be used in a system that controls operation of the optical transmitter 104 and the optical receiver 106. By way of another example, the computing device 500 can be used in a system that stores data values transmitted by the transmitter 104 and received by the receiver, and that computes measures of correlation based upon these stored values. The computing device 500 includes at least one processor 502 that executes instructions that are stored in a memory 504. The instructions may be, for instance, instructions for implementing functionality described as being carried out by one or more components discussed above or instructions for implementing one or more of the methods described above. The processor 502 may access the memory 504 by way of a system bus 506. In addition to storing executable instructions, the memory 504 may also store data values transmitted by the transmitter 104 or data values received by the receiver.

The computing device 500 additionally includes a data store 508 that is accessible by the processor 502 by way of the system bus 506. The data store 508 may include executable instructions, stored data values, etc. The computing device 500 also includes an input interface 510 that allows external devices to communicate with the computing device 500. For instance, the input interface 510 may be used to receive instructions from an external computer device, from a user, etc. The computing device 500 also includes an output interface 512 that interfaces the computing device 500 with one or more external devices. For example, the computing device 500 may display text, images, etc. by way of the output interface 512.

It is contemplated that the external devices that communicate with the computing device 500 via the input interface 510 and the output interface 512 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 500 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 500 may be a distributed system. Thus, for instance, several devices may be in communication by way of a network connection and may collectively perform tasks described as being performed by the computing device 500.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method for detecting tampering with a seal, comprising:
    calibrating a seal that includes a quantum optical transmitter in communication with a quantum optical receiver by way of a communications channel, wherein calibrating the seal comprises:
        receiving a first plurality of pulses of light at the quantum optical receiver, the first plurality of pulses received prior to occurrence of tampering on the communications channel between the optical receiver and the quantum optical transmitter;
        identifying a calibrated threshold correlation value based upon the first plurality of pulses and randomly selected first data encoded on the first plurality of pulses by the quantum optical transmitter; and
    detecting tampering on the communications channel between the quantum optical receiver and the quantum optical transmitter subsequent to calibrating the seal, wherein detecting the tampering comprises:
        receiving, at the quantum optical receiver, a second plurality of pulses of light, wherein randomly selected second data is encoded on the second pulses of light by the quantum optical transmitter;
        storing a respective measured data value for each of the received second pulses;
        identifying a correlation statistic based upon a comparison of the measured data values of the second pulses and the encoded data values of the second pulses; and
        outputting, based upon the correlation statistic and the threshold correlation value, an indication of tampering on the communications channel between the quantum optical receiver and the quantum optical transmitter.

2. The method of claim 1, wherein outputting the indication of tampering on the communications channel between the quantum optical receiver and the quantum optical transmitter comprises outputting the indication of tampering on a fiber-optic communications channel, wherein the fiber-optic communications channel is used to seal an object.

3. The method of claim 1, wherein outputting the indication of tampering is based upon identifying that the correlation statistic is below the threshold correlation value.

4. The method of claim 1, further comprising updating the correlation statistic based upon receiving a third plurality of pulses of light.

5. The method of claim 1, wherein the values encoded on the first pulses and the second pulses by the quantum optical transmitter are encoded on polarization states of photons.

6. The method of claim 5, wherein storing the respective value for each of the second pulses comprises:
    identifying a polarization state of photons in the pulse; and storing the respective value based upon the identified polarization state.

7. The method of claim 1, wherein the values encoded on the first pulses and the second pulses by the quantum optical transmitter are encoded on a quadrature of the light.

8. The method of claim 7, wherein storing the respective value for each of the second pulses comprises:
identifying a value of the quadrature of the pulse; and
storing the value of the quadrature of the pulse.

9. A sealing system, comprising:
a quantum optical transmitter;
a quantum optical receiver in optical communication with the quantum optical transmitter by way of a communications channel; and
a computing device in communication with the quantum optical transmitter and the quantum optical receiver, the computing device configured to perform the following acts:
performing a calibration process for the sealing system to identify a calibrated threshold correlation value for the sealing system, wherein performing the calibration process comprises:
causing the quantum optical transmitter to transmit a first plurality of pulses of light to the quantum optical receiver by way of the communications channel, each of the first plurality of pulses of light encoded with respective randomly selected data by the quantum optical transmitter, the first plurality of pulses received at the quantum optical receiver prior to occurrence of tampering on the communications channel; and
identifying the calibrated threshold correlation value for the sealing system based upon the first plurality of pulses and the data encoded on the first plurality of pulses by the quantum optical transmitter;
detecting a tampering event on the communications channel, wherein detecting the tampering event comprises:
causing the quantum optical transmitter to transmit a second plurality of pulses of light to the quantum optical receiver by way of the communications channel, each of the second plurality of pulses of light encoded with respective randomly selected data by the quantum optical transmitter;
storing, based upon measurements of the second plurality of pulses of light by the quantum optical receiver, a respective data value for each of the second pulses; and
comparing the respective stored data values with the respective data values encoded on the second pulses to identify a correlation measure; and
outputting an indication of tampering on the communications channel based upon the correlation measure and the threshold correlation value.

10. The system of claim 9, wherein the quantum optical transmitter and the quantum optical receiver are integrated optical circuits.

11. The system of claim 9, wherein the quantum optical transmitter is a continuous-variable (CV) optical transmitter, wherein further the quantum optical receiver is a CV optical receiver.

12. The system of claim 11, wherein the respective encoded data values are Gaussian random values encoded on quadratures of the light.

13. The system of claim 11, wherein the correlation measure comprises a covariance matrix between the stored data values of the second pulses and the encoded data values on the second pulses.

14. The system of claim 9, wherein the quantum optical transmitter is a discrete-variable (DV) optical transmitter, wherein further the quantum optical receiver is a DV optical receiver.

15. The system of claim 9, wherein the communications channel comprises a fiber optic channel, the fiber optic channel configured to seal an object.

16. The system of claim 15, wherein the fiber optical channel comprises a helical-core fiber optic cable.

17. The system of claim 9, wherein the computing device is configured to output the indication of tampering on the communications channel based upon identifying that the correlation measure is below the calibrated threshold correlation value for the communications channel by a predefined amount, the predefined amount based upon user input received at the computing device.

18. A computer-readable storage medium comprising instructions that, when executed by a processor, cause the processor to perform acts comprising:
calibrating an optical sealing system that includes a quantum optical transmitter and a quantum optical receiver that are in optical communication by way of a communications channel, wherein calibrating the optical sealing system comprises:
causing the quantum optical transmitter to transmit a first plurality of pulses of light to the quantum optical receiver by way of the communications channel, each of the first plurality of pulses of light encoded with respective random data on quadratures of the light by the quantum optical transmitter; and
identifying a calibrated threshold correlation value based upon the first plurality of pulses and the data encoded on the first plurality of pulses by the quantum optical transmitter;
causing the quantum optical transmitter to transmit a second plurality of pulses of light to the quantum optical receiver by way of the communications channel, each of the second plurality of pulses of light encoded with respective random data on quadratures of the light by the quantum optical transmitter;
storing, based upon measurements of the second plurality of pulses of light by the quantum optical receiver, a respective data value for each of the second pulses;
creating a covariance matrix based upon the stored data values and the data values encoded on the second pulses; and
outputting an indication of tampering on the communications channel based upon the covariance matrix and the calibrated threshold correlation value.

19. The method of claim 1, wherein outputting the correlation statistic is based further upon transit times of the second plurality of pulses between the quantum optical transmitter and the quantum optical receiver.

20. The method of claim 1, further comprising:
receiving a third plurality of pulses of light at the quantum optical receiver; and
updating the calibrated threshold value based upon the third plurality of pulses.

* * * * *